United States Patent [19]
World

[11] Patent Number: 5,190,366
[45] Date of Patent: Mar. 2, 1993

[54] MULTI-COLORED LUMINESCENT FISHING LURE

[75] Inventor: Victor B. World, Cincinnati, Ohio

[73] Assignee: World Plastics Corporation, Cincinnati, Ohio

[21] Appl. No.: 778,727

[22] Filed: Oct. 17, 1991

[51] Int. Cl.⁵ .............................................. F21K 2/00
[52] U.S. Cl. ..................................... 362/34; 362/234; 362/253; 43/17.5; 43/17.6
[58] Field of Search ............... 362/34, 84, 231, 234, 362/249, 252, 253, 396; 43/17.5, 17.6

[56] References Cited

U.S. PATENT DOCUMENTS

| | | | |
|---|---|---|---|
| 3,749,679 | 7/1973 | Rauhut | 252/188.3 |
| 3,816,326 | 6/1974 | Bollyky | 252/188.3 |
| 3,888,786 | 6/1975 | Maulding | 252/188.3 |
| 4,061,910 | 12/1977 | Rosenfeld | 362/34 |
| 4,508,642 | 4/1985 | World | 252/700 |
| 4,751,616 | 6/1988 | Smithey | 362/34 |
| 4,800,670 | 1/1989 | Mattison | 43/17.6 |
| 4,823,497 | 4/1989 | Pierce | 43/17.6 |
| 4,972,623 | 11/1990 | Delricco | 43/17.6 |

Primary Examiner—Stephen F. Husar
Attorney, Agent, or Firm—Frost & Jacobs

[57] ABSTRACT

An arrangement for displaying two or more colors of chemiluminescent light simultaneously as a fishing lure is disclosed. The lure comprises a connector body which maintains a plurality of color tubes in a predetermined angular and non-aligned relationship, and is contemplated primarily for use commercially for the catch of swordfish, tuna and the like.

25 Claims, 6 Drawing Sheets

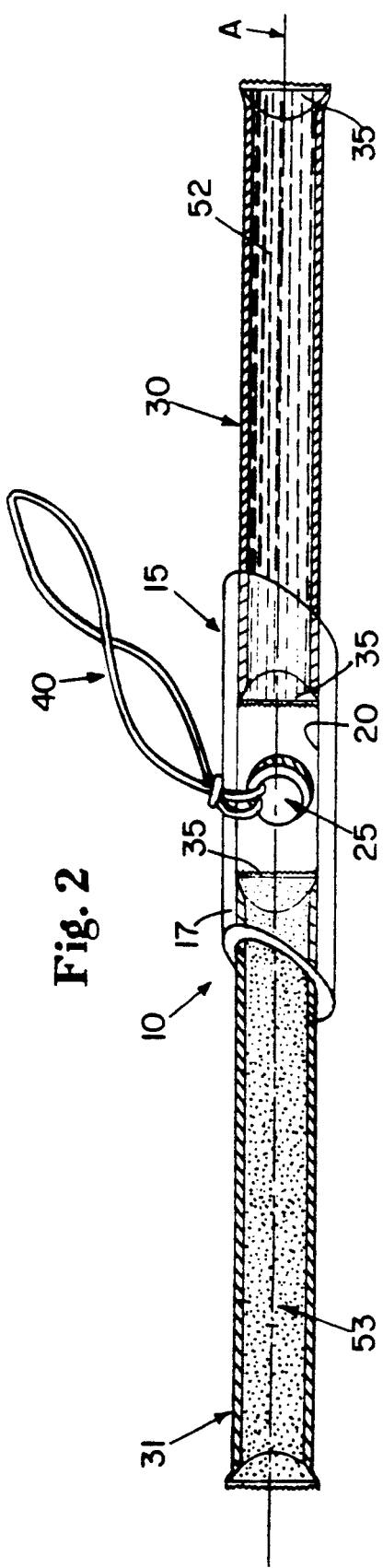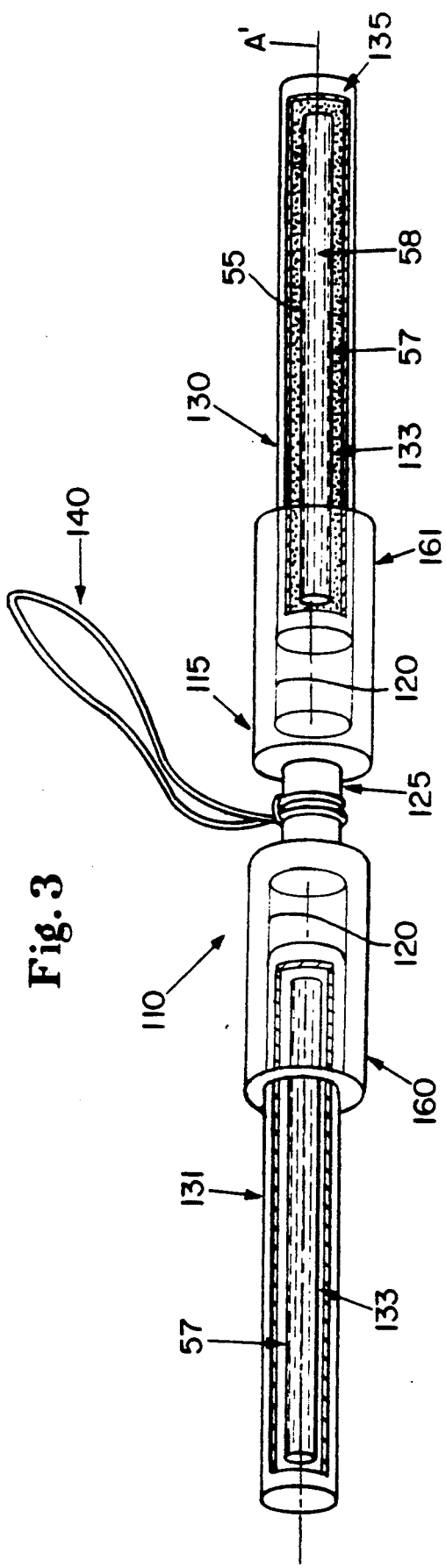

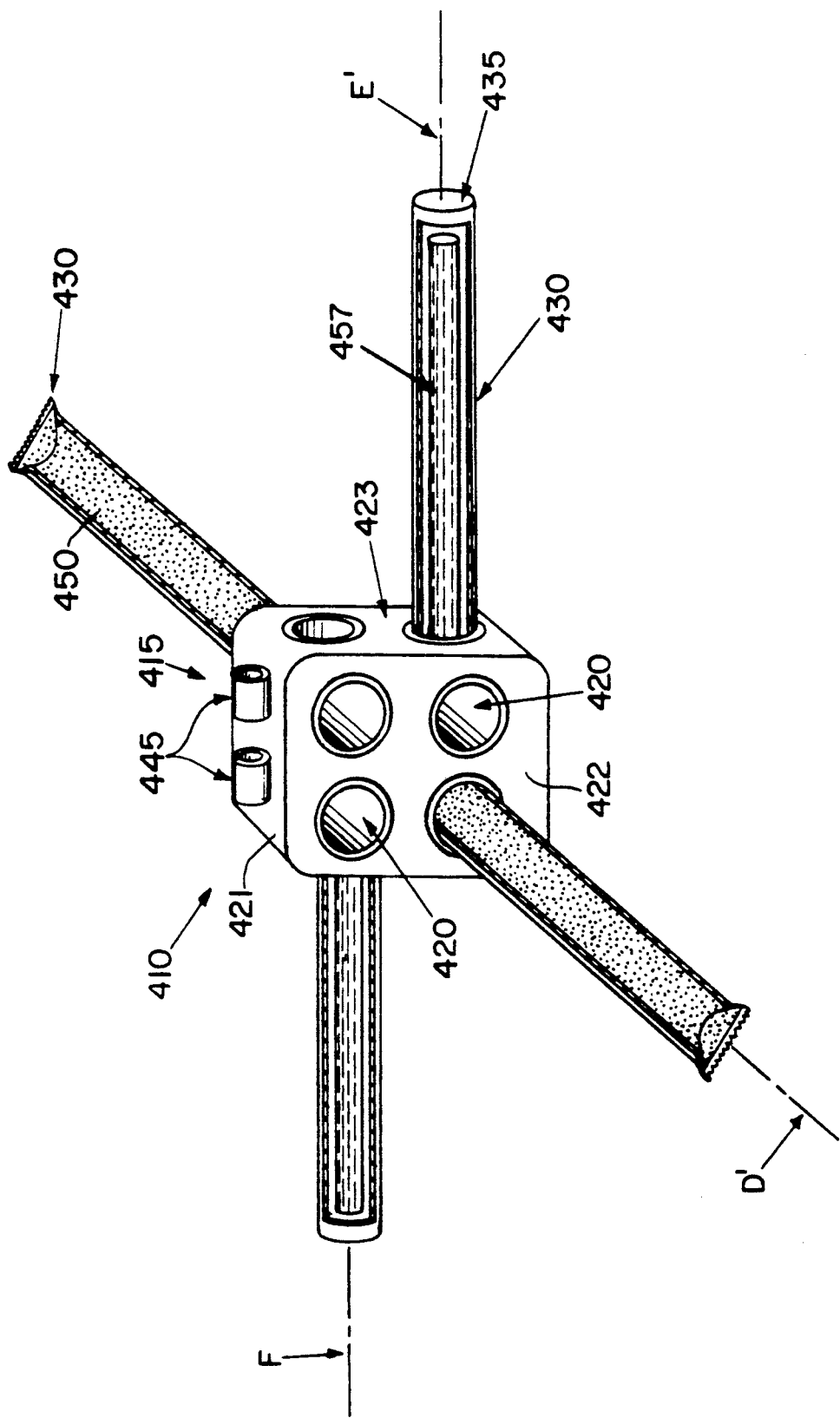

MULTI-COLORED LUMINESCENT FISHING LURE

TECHNICAL FIELD

This invention relates to a multi-colored luminescent fishing lure, and, more particularly, to a unitary arrangement comprising a lure connector for receiving and maintaining two or more different color light tubes in a predetermined angular relationship for simplified use and optimal lure efficiency.

BACKGROUND ART

The art of generating light from chemical energy has been practiced for many years. Chemiluminescent light of appreciable yields (e.g., that which one could read a newspaper by) has only been in practice, however, since the early 1970's.

U.S. Pat. No. 3,749,679 (Ruhut), U.S. Pat. No. 4,751,616 (Smithey), U.S. Pat. No. 3,888,786 (Maulding), and U.S. Pat. No. 3,816,326 (Bollyky), are fairly descriptive of such chemiluminescent systems. Additionally, it was about that time that commercial fisherman learned that this new generation of chemiluminescent lures were useful in attracting swordfish and tuna (as well as other species).

For catching swordfish and tuna, a "longline" vessel is generally used. A typical longline vessel will employ the use of one or more main line spools capable of holding thirty to sixty miles of 700-1200 pounds tensile strength nylon monofilament line. This mainline is supported through a series of buoys evenly placed throughout its length, and is usually dispensed in its entirety with 300 to 900 separate leader lines evenly dispersed (usually called a "set"). The length of these leader lines determines the depth of fishing. At the end of each leader line is a hook with, typically, a one pound squid attached as bait. The chemiluminescent lure is usually attached from one to ten feet from the bait. The purpose of this lure is to attract swordfish and tuna (tuna species generally being BIGEYE, YELLOWFIN, and BLUEFIN) to the bait from a range that exceeds their sense of smell. Curiosity about the light source generally attracts the fish to within the "smell" range of the squid, thus causing the fish to take the bait and be caught.

This entire process of placement and retrieval is repeated every twenty-four hours for the entire trip length (usually 7 to 28 days). Since the nature of chemiluminescence is that the average "glow" life is between about 12 to 18 hours, the spent lures must obviously be removed every set and discarded in favor of new ones.

This obviously demonstrates the relatively high cost in tackle for the operation, thereby making great the need for maximizing the catch ratio for each lightstick lure utilized. Another problem is that certain colors of chemiluminescent lures may not always work well under various defined conditions. Conditions such as water clarity, depth, time of day or night, and water temperature can all have an effect on the fishermen's yield using any particular color of lightstick.

Theory in practice has proven that the targeted species of fish attracted by chemiluminescence interpret and respond to various wavelengths of light differently. For example, in 68° F. murky water at 50 fathoms, night fishing, a blue chemiluminescent lure might attract swordfish, whereas under the same conditions a tuna might not respond to the color displayed. Likewise, under a different set of conditions, a tuna might be attracted to a green chemiluminescent lure, while a swordfish would not.

Attempts have been previously made by fishermen to increase their catch by attachment of two separate and different colored lures. This method was generally deemed inefficient and impractical due to the radical increase in cost of doubling their gear, and likewise doubling the required labor and time to attach two separate lures onto each single leader line.

Since the chemiluminescent lure is generally attached to the leaders by mean of a rubberband, the attached lure usually hangs in whichever direction gravity and/or water current dictates.

When two lures, each of a different color for example, are attached to the leader, they are susceptible to the same currents and water movements, often forcing them to hang in an aligned or side by side manner. As used herein, the term "aligned" is used to connote the condition where two or more color tubes are closely adjacent one another and at least partially overlapping, parallel, or superposed on one another such that radiation energy from one color tube is at least partially blocked by the other tube. This aligned configuration causes the effective appearance of only one color of light being emitted (or at least drastically reduced effectiveness of at least one of the colors), especially when diffused by water. In any event, the effectiveness of the colors, and of the luminescent lure overall, is significantly reduced or negated when the color tubes are aligned.

The term "chemiluminescent" as used herein, means a substance (usually a mixture of light affecting material) which emits light by chemical reaction.

The term "light" as used herein, is defined as electromagnetic radiation at wavelengths falling in the visible spectrum, such as between about 350 and 800 millimicrons.

The term "two component chemiluminescent system" as used herein, means generally a clear flexible tube containing one component, with a frangible ampule housed inside the tube and containing a second component that, when said frangible tube is fractured, mixes with the first component producing light. An aromatic ester of oxalic acid in a suitable solvent (the "oxalate component"), usually preferably comprises the first component of a two component chemiluminescent system. A solution of a hydrogen peroxide compound, a hydroperoxide compound, or a peroxide compound in a suitable solvent (the "peroxide component"), usually preferably comprises the second component of a two component chemiluminescent system.

The terms "frozen" or "low-temperature storage" luminescent color tubes will be used herein to connote a premixing of chemiluminescent components, filling tubing with the components, and immediately cooling and maintaining the tube at very low temperatures by the means of dry ice, low temp freezers, or the like, to inhibit the chemical reaction until the tube (lure) is used.

Generally, light activation in the above-noted types of devices is of two basic types. In one type, a frangible glass ampule contains one component of the chemiluminescent system, with the remaining or second component of the chemiluminescent system being contained within the hollow interior of the color tube. When the ampule is broken, as by bending the tube the chemiluminescent materials mix together producing visible light as described above. The second approach, mentioned above, requires premixing the chemiluminescent materials, then maintaining the tubular packaging at a very low temperature by means of dry ice or the like to inhibit the chemical reaction until the display is used. Typical examples of these types of containers are described in U.S. Pat. Nos. 4,508,642 and 4,061,910.

DISCLOSURE OF THE INVENTION

It is an object of this invention to obviate the above-described problems and shortcomings of chemiluminescent fishing lures heretofore available in the industry.

It is another object of the present invention to provide a multi-colored chemiluminescent fishing lure which enables quick and efficient attachment of the lure and optimal display and effectiveness of the individual chemiluminescent colors.

It is yet another object of the present invention to provide a multi-colored chemiluminescent fishing lure which enables the prominent display of the various colors desired in a predetermined spaced and non-aligned orientation relative to one another in order to optimize the lure characteristics of the independent colors, while maintaining a compact and efficient lure combination.

It is still another object of the present invention to provide an improved fishing lure capable of displaying a plurality of different chemiluminescent lures with a unitary lure structure, while providing a relatively simple structure adaptable to a wide variety of particular lure needs and preferences.

It is also an object of the present invention to provide a multi-colored chemiluminescent fishing lure having a modular structure for facilitating both uniform manufacturing and use, and further capable of use in multiple combinations in order to enable adaptability to a wide variety of applications.

It is another object of the present invention to provide a multi-colored chemiluminescent fishing lure which is relatively simple in structure, easy to use, and minimizes the labor and costs involved while maximizing the effectiveness of multi-colored light tubes.

In accordance with one aspect of the present invention, there is provided a multi-colored chemiluminescent fishing lure which includes a unitary connector body having a plurality of spaced recesses for receiving individual chemiluminescent color tubes of different colors. The recesses are arranged in the body so as to extend outwardly at an angular orientation relative to one another in order to maintain the color tubes in a spaced, non-aligned relationship with one another. A rubberband or similar flexible and, preferably extensible, attachment device enables quick attachment of the lure to a fishing line.

In a preferred embodiment, the unitary connector body comprises a relatively clear and somewhat flexible tubular member, wherein a pair of color tubes may be oppositely disposed in relatively coaxial orientation. In this arrangement, the color tubes extend in outward opposite directions from one another to optimize the effective distance and space between the different colors, while taking advantage of a common connector body and a single flexible attachment apparatus. In further preferred embodiments, the unitary connector body is provided in modular form with corresponding connector joints which enable a plurality of connector bodies to be locked together in selected orientations, thereby enabling a single attachment of a plurality of different colored light tubes oriented in custom selected angular relationships to one another, as desired.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 2 is a schematic elevational view of a multi-colored fishing lure made in accordance with the present invention;

FIG. 3 is a schematic elevational view of an alternate preferred embodiment of a multi-colored chemiluminescent fishing lure made in accordance herewith;

FIG. 6 is a schematic perspective view of another preferred embodiment of the present invention, illustrating a substantially rectangular connector body.

DETAILED DESCRIPTION OF THE INVENTION

Figure 1A:
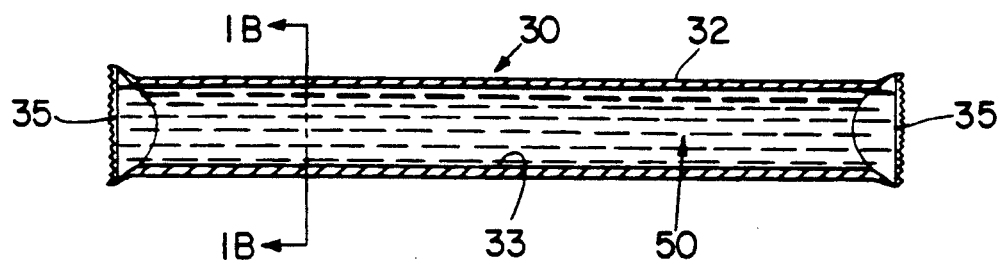
FIG. 1A is a partial cross-sectional view of a chemiluminescent color tube which will be attached as part of the present fishing lure to provide radiation energy of a desired wavelength (or color) to lure fish.

Referring now to the drawings in detail, wherein like numerals (i.e., numerals having the identical last two digits, such as 20, 120, 220, etc.) indicate like elements throughout the views, FIG. 1A illustrates a tubular luminescent color tube 30 generally formed from an elongated, partially flexible clear plastic tubular member 32. Tubular member 32 is provided with a longitudinally extending hollow interior 33, and may be formed, such as by extrusion, from material such as polyvinylchloride, ethylene vinyl acetate, polyethylene, ethyl acrylate, ethylene methacrylic acid, polypropolene, or the like.

Figure 1B:
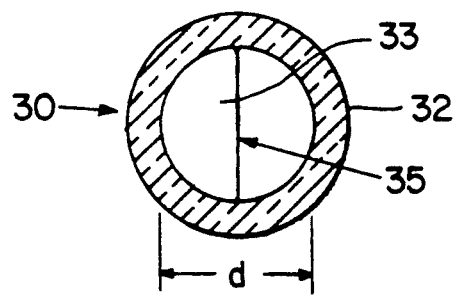
FIG. 1B is a vertical cross-sectional view of the color tube of FIG. 1A, taken along line 1B—1B thereof.

Color tube 30 is sealed at both ends, such as shown at closed ends 35, in order to form a closed-ended interior volume which will be partially or completely filled with light affecting material. As used herein, the terms "light affecting material" and "luminescent" shall generally connote any material having the capability of producing a colored visual or optical effect, and includes, but is not limited to luminescent materials, two component chemiluminescent materials, separate component materials that produce light when mixed together, bio-luminescent materials, fluorescent materials, colored dyes, liquid crystal material, or combinations of these or similar materials. Closed ends 35 can be provided by a variety of conventional means such as heat sealing, adhesives, plugs, or the like. It will be understood that ends 35 of color tube 30 are permanently or factory sealed so that the package cannot be opened by the user under normal use. The resulting configuration of color tube 30 is a package containing materials which can be observed through the walls of the light transmissive tubular member 32. FIG. 1B illustrates that tubular member 32 will preferably have a substantially circular cross-sectional conformation, although other cross-sectional shapes could be equally employed closed end 35 is illustrated in FIG. 1B as a conventional pinch or heat seal type closure.

As will be understood, the length of color tube 30 can be varied as desired, thereby allowing use of a greater or lesser amount of luminescent material within hollow interior 33. A predetermined amount of color affecting material 50 will be placed within hollow interior 33 to provide light radiation at a predetermined wavelength in the visible spectrum, as desired. The volume of color tube 30 can also be varied by increasing or decreasing the cross-sectional area (or diameter) of hollow interior 33, and greater or lesser amounts of luminescent material may be required depending upon the amount and intensity of light desired from the lure for particular applications.

As a preferred example, a color tube 30 for use in commercial fishing practices might preferably have an effective inside diameter (d) of approximately 0.150 inches (3.8 mm), and a length of approximately 4.5 inches (11.4 cm). As mentioned, the outer shape of color tube 30 can be of any desired circular or non-circular conformation, including elliptical or polygonal geometrics. Substantially circular tubular conformation is preferred to facilitate manufacturing procedures, and to insure relatively uniform and symmetrical transmissiveness of the light radiation produced by the light affecting material therewithin. As will also be understood, a circular outer conformation of light tube 30 of relatively uniform dimensions will also simplify overall the manufacturing, assembly, and inventory characteristics of the subject multi-colored luminescent fishing lures.

FIG. 2 is a schematic elevational view of a preferred multi-colored fishing lure 10 made in accordance with the present invention. Particularly, fishing lure 10 comprises a unitary connector body 15 which is illustrated as further comprising a tubular element 17 having a bore formed therethrough along longitudinal axis A. As will be understood, this longitudinal bore effectively provides a pair of oppositely disposed recesses 20 for receiving a corresponding pair of color tubes (30 and 31) in relatively coaxial orientation along axis A. A laterally extending bore 25 provides a hanger or tie-off location for means 40 for attaching fishing lure 10 to a fishing line.

FIG. 2 illustrates connector body 15 following insertion into its oppositely disposed spaced recesses 20 of the respective ends of color tubes 30 and 31. In this way, tubes 30 and 31, which will house materials for affecting different colors of light radiation, are oriented approximately 180° from one another along axis A. Such oppositely disposed outward radial orientation from connector body 15 maximizes the effective physical separation of the different colors of light radiation of lure 10, and increases the distance at which these colors can be effectively distinguished, thereby maximizing the luring affects of each.

As discussed above, multiple component chemiluminescent materials are often mixed together and inserted in a color tube, then chilled in order to delay the chemical reaction of the mixture which causes production of the colored light radiation. FIG. 2 illustrates color tube 30 with a mixture of chemiluminescent material 52 for providing a first colored lure, while color tube 31 includes a mixture of chemiluminescent material 53 for providing a second different color of radiation output. As also mentioned above, another approach for light activation includes the use of a frangible glass ampule to contain one component of the two component chemiluminescent system, in order to isolate the two components from one another until the lure is to be used.

FIG. 3 illustrates an embodiment showing a pair of ampule-type color tubes 130 and 131, respectively. It should be understood that color tubes containing any of the various light affecting materials can be equally substituted into any of the embodiments shown and described herein, and the actual embodiments herein are illustrated and described only as examples for the purpose of describing the present invention.

In FIG. 3, a multi-colored luminescent fishing lure 110 is shown as comprising a unitary connector body 115 having a pair of oppositely disposed color tube receptors 160 and 161, respectively. A hanger device 125 axially connects the inner ends of receptors 160 and 161, and provides a tie-off element for flexible means 140 for attaching lure 110 to a fishing line. Flexible attaching means 140 preferably comprises an extensible element, such as a durable rubberband or the like, but could equally comprise a flexible wire or tie-string arrangement.

As described with respect to fishing lure 10 above, connector body 115 of lure 110 comprises a plurality of spaced recesses 120 for receiving individual luminescent color tubes of different colors. As with the embodiment shown in FIG. 2, connector body 115 orients its pair of spaced recesses 120 in substantially opposite outward radial directions along longitudinal axis A'. As mentioned, each of the color tubes 130 and 131 is illustrated as including a hollow interior 133 filled with a first chemiluminescent component (e.g., 55), and including a frangible ampule 57 containing a second chemiluminescent component 58. As will be understood, because color tubes 130 and 131 will provide radiant light at different wavelengths and/or different colors, the specific chemiluminescent components (55 and 58) in each of these tubes will probably be different. It should be noted that in addition to mixing different components, different light colors can be obtained in other ways, such as by coating the light tube with dye or similar pigment such as described in U.S. Pat. No. 4,379,320 (Mohan et al.).

Figure 4A:
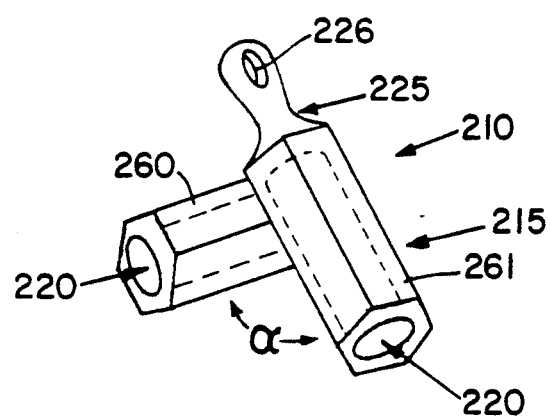
FIG. 4A is a perspective view of an alternate embodiment of the present multi-colored chemiluminescent fishing lure, illustrating an example of a modular design including structure for locking a plurality of modular connector bodies into a desired orientation and combination.
Figure 4B:
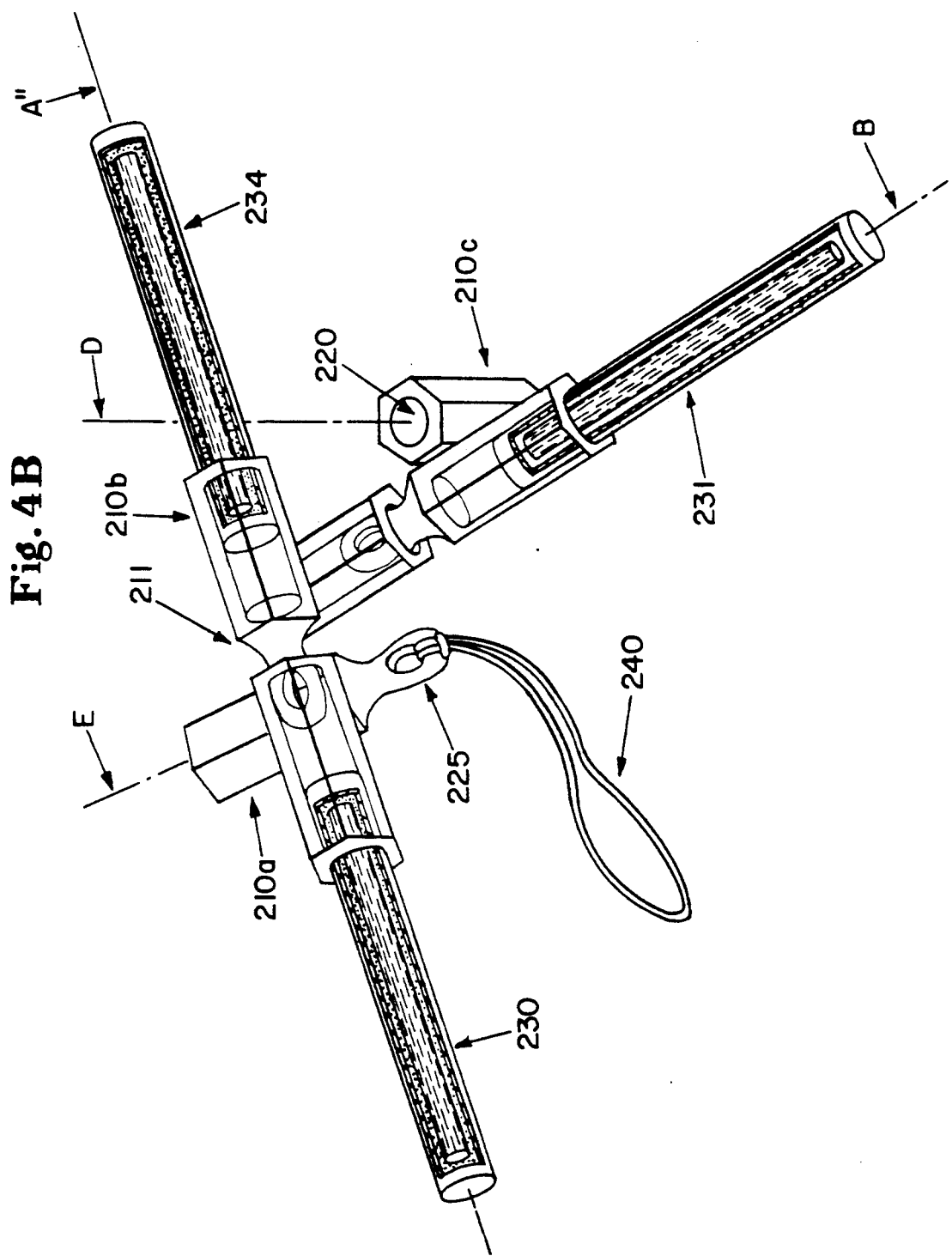
FIG. 4B is a perspective view of a combination lure constructed from a plurality of modular fishing lures as illustrated in FIG. 4A.

FIGS. 4A and 4B illustrate yet another preferred embodiment of a multi-colored luminescent fishing lure made in accordance herewith. Particularly, FIG. 4A illustrates a perspective view of a multi-colored luminescent fishing lure 210 having a connector body 215 having a pair of color tube receptors 260 and 261, respectively, oriented relative to one another at a predetermined angle α. It is contemplated that connector body 215 could be provided as a unitary piece via injection molding or the like, or might be formed from a plurality of pieces joined together by adhesive connections or the like. Color tube receptors 260 and 261 provide a pair of spaced recesses 220 oriented in a non-aligned relationship for receiving and holding respective color tubes.

A hanger 225 is preferably provided in the form of a bulbous protuberance 226. Fishing lure 210 thereby comprises a modular form which can selectively receive and maintain a plurality of color tubes and/or be connected via its bulbous protuberance 226 to one or more like connector bodies 215 to provide a custom fishing lure which can be adjusted and adapted to orient an essentially unlimited number of different colors of luminescent tubes in a virtually unlimited array of angular orientations. As used herein, the term "modular" is used to connote a standardized connector body structure which can be utilized independently or connected together (or "plugged in") to like structures to essentially build a custom fishing lure.

As illustrated in FIG. 4B, three modular luminescent fishing lures 210a, 210b, and 210c have been fitted together to provide a combination luminescent fishing lure 211 having a multitude of orientation axes (e.g., axes A", B, D, and E). As will be appreciated, the bulbous protuberance 226 is designed to frictionally interlock within one of the spaced recesses 220 of another modular connector body 215. Moreover, where recesses 220 and protuberance 226 are provided with substantially symmetrical and corresponding (e.g., cylindrical) outer conformations, the individual modular fishing lure connector bodies can be relatively rotated to adjust the angular relationships between adjacent recesses 220 in order to customize the orientation of color tubes supported as part of fishing lure 211. Particularly, color tubes 230, 231 and 234 have been illustrated as being lockingly received and maintained within respective recesses 220 of each of the connected fishing lures 210a, 210b, and 210c.

While a flexible attaching means 240 is illustrated as being attached to hanger 225 of modular fishing lure 210a, alternate attachment points could equally be utilized to more evenly balance the weight of the lure 211 when attached to a fishing line. Particular location of the attachment means of the present invention can also be altered to facilitate or induce movement of a fishing lure when in use, or to minimize such movement, as desired.

Figure 5:
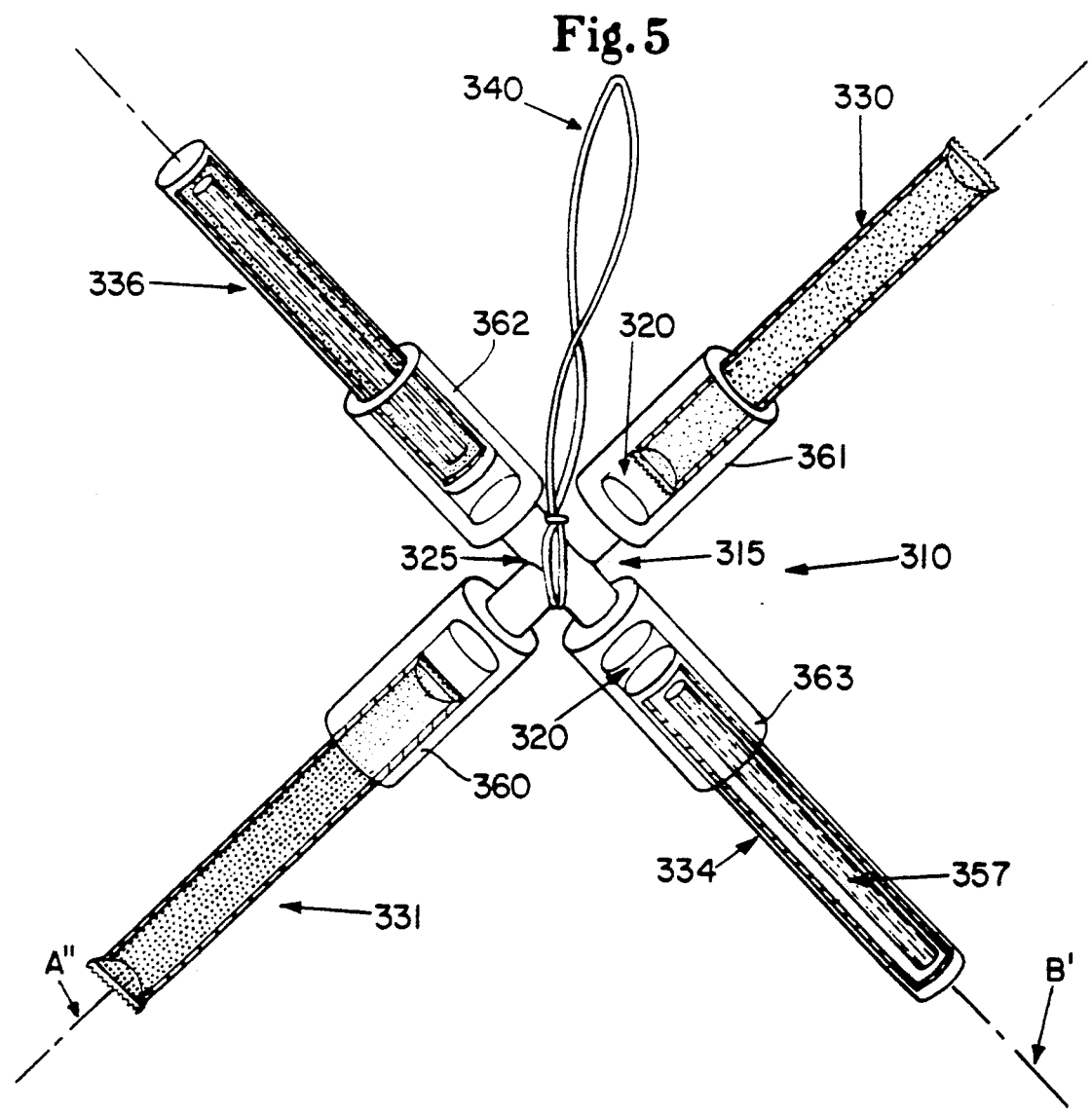
FIG. 5 is a schematic elevational view of yet another preferred embodiment of a multi-colored chemiluminescent fishing lure made in accordance with the present invention.

FIG. 5 is a schematic elevational view of a multi-colored fishing lure 310 having a connector body 315 with four mutually perpendicular color tube receptors 360-363. As indicated, the center portion of connector body 315 might preferably be formed with a spoke-like hanger 325 which connects the adjacent receptors and provides a convenient connection point for flexible attaching means 340. As with the embodiments described above, each of the color tube receptors 360-363 includes a recess 320 for receiving individual luminescent color tubes (e.g., tubes 330, 331, 334 and 336). As discussed above, the color tubes arranged in any particular luminescent fishing lure of the present invention can comprise any desired combination of ampule-type tubes, low temperature stored chemical reactive mixtures, or other light affecting material combinations. Similarly, all of the spaced recesses 320 need not receive a color tube in any particular application.

FIG. 6 illustrates a multi-colored luminescent fishing lure 410 comprising a connector body 415 of substantially rectangular, block-type construction, having a plurality of outwardly facing planar faces (e.g., 421-423). As illustrated, within one or more of the outwardly facing planar surfaces 421-423, a plurality of radially oriented recesses (420) are formed for receiving and holding a plurality of color tubes (e.g., 430). As also illustrated, rectangular connector body 415 and its radially oriented spaced recesses 420 provide for the support of a plurality of color tubes (430) along a plurality of spaced, non-planar axes (e.g., axes D', E', and F). Fishing lure 410 is illustrated as including a mixture of different types of color tubes (e.g., several are shown with ampule-type arrangements, and several are the low temperature storage mixtures).

While a hanger device (not shown) similar to that described above (e.g., hanger 225 of FIGS. 4A and 4B) could be incorporated, a pair of clips 445 are illustrated in FIG. 6 as an example of a non-flexible means for attaching lure 410 to a leader line. It is contemplated that one or more clips (e.g., 445) mounted on or formed as part of connector body 415 can provide a snap-fit attachment of lure 410 onto the line. Clips 445 are illustrated as a pair of flexible, tubular collars having a hollow interior to receive the fishing line in locking relation therewithin, and a longitudinal slot along their upper portions. The line can be inserted by forcing it through the flexible slot and snapping it into the hollow interior of clips 445. Other relatively non-flexible attaching means, such as spring-loaded swivel snaps, clamps, or the like, could also be equally substituted on any of the embodiments described herein. Relatively rigid attachment of the fishing lure to a fishing line might be desirable such as to prevent movement of the lure relative to the line in use.

Connector body 415 provides ample recesses 420 for relatively universal application for multi-colored lure arrangements having two or more different colored tubes. As with the other connector bodies discussed herein, it is preferred that connector body 415 be provided of a clear or at least translucent material to minimize interference or shielding of light emitted by the light tubes.

Figure 7:
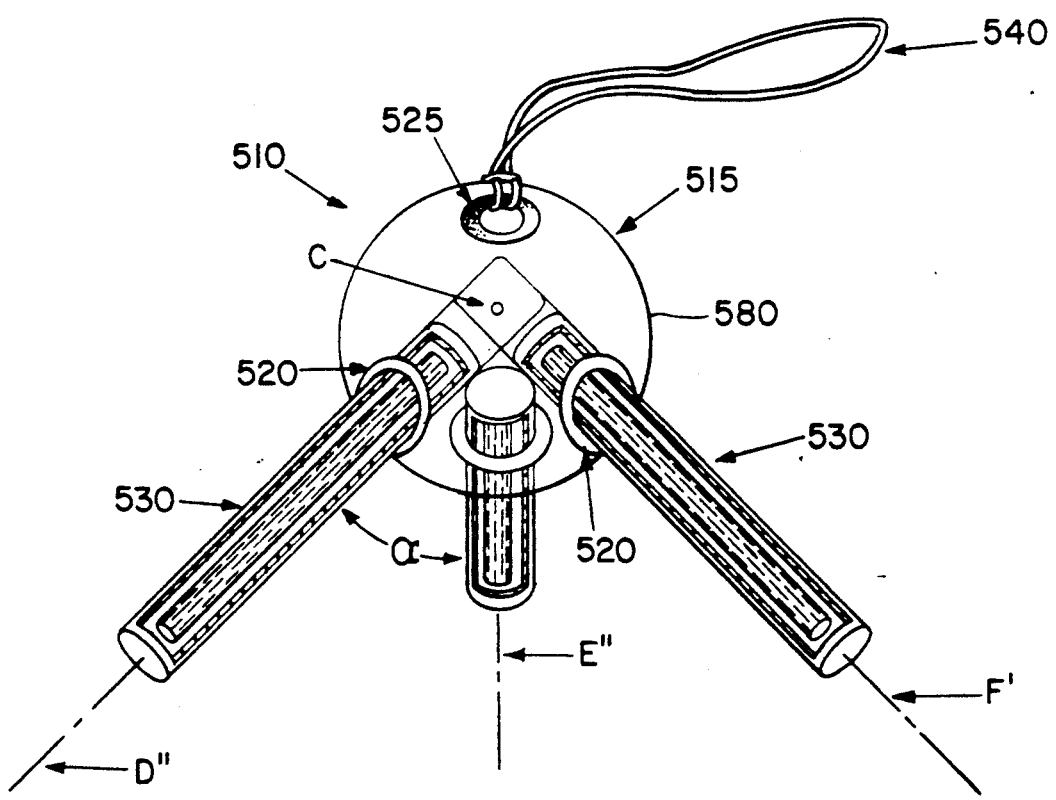
FIG. 7 is a schematic perspective view of another preferred embodiment of the present invention, illustrating a connector body having a substantially spherical conformation.

FIG. 7 shows yet another arrangement of the subject invention, wherein connector body 515 of fishing lure 510 comprises a substantially solid block 580 having a substantially rounded or spherical outer conformation and a center point C. A plurality of spaced recesses 520 extend radially outwardly from adjacent center point C along divergent axes (e.g., axes D", E" and F'). A hanger arrangement 525 is provided for flexible attaching means 540, and the various recesses 520 can be oriented in a variety of angular relationships (e.g., $a$). While recesses 520 are illustrated as being equally spaced and somewhat symmetrical with one another, and oppositely disposed from hanger element 525, such need not be the case. For example, unbalanced spacing might be preferred if movement of fishing lure 510 is desired in use.

Having shown and described the preferred embodiments of the present invention, further adaptions of the multi-colored luminescent fishing lure of the present invention can be accomplished by appropriate modifications by one of ordinary skill in the art without departing from the scope of this invention. Several of such potential modifications have been discussed, and others will be apparent to those skilled in the art. For example, while it is preferred that the connector body of the present fishing lure be relatively clear or transparent for unencumbered transmission of radiant energy produced by the respective color tubes, translucent or partially opaque materials might also be used in appropriate circumstances. As mentioned, the subject fishing lures can be attached to a line by flexible or relatively rigid attachment devices, as desired.

Similarly, while relatively frictional interaction between corresponding cylindrical color tubes connected as part of the fishing lure and the recesses of the connector body have been shown and described, other shapes can be utilized. Similarly, other means of attachment between the color tubes and recesses can be incorporated, such as adhesives, threaded arrangements, snap-fit arrangements, bayonet arrangements, or the like. Accordingly, the scope of the present invention should be considered in terms of the following claims, and is understood not to be limited to the details of structure and operation shown and described in the specification and drawings.

I claim:

1. A multi-colored luminescent fishing lure comprising a unitary connector body, said connector body having a plurality of spaced recesses for receiving individual luminescent color tubes of different colors, said recesses disposed in said body in an outward angular orientation from one another to maintain said color tubes in a spaced and non-aligned relationship with one another, and means for attaching said lure to a fishing line.

2. The fishing lure of claim 1, wherein said connector body is formed of an at least translucent material.

3. The fishing lure of claim 1, wherein said connector body is relatively rigid and transmissive of light emitted from color tubes mounted in its recesses.

4. The fishing lure of claim 1, wherein said attaching means comprises a hanger attached to said connector body.

5. The fishing lure of claim 1, wherein said attaching means comprises a flexible member for non-rigidly attaching said lure to said fishing line.

6. The fishing line of claim 1, wherein said attaching means comprises means for relatively rigidly attaching said fishing lure to said fishing line.

7. The fishing lure of claim 1, wherein said connector body comprises a tubular member having a pair of oppositely disposed recesses for receiving a pair of color tubes in relatively coaxial orientation, whereby said color tubes are oriented approximately 180 degrees from one another.

8. The fishing lure of claim 1, wherein said connector body comprises a substantially rectangular block having a Plurality of outwardly facing planar surfaces, and a plurality of radially oriented recesses formed in said planar surfaces.

9. The fishing lure of claim 1, wherein said connector body comprises a substantially solid block structure having a center point and a rounded outer conformation, wherein said plurality of recesses are formed in said body in spaced in radially oriented relationship extending outwardly from adjacent said center point along divergent axes.

10. The fishing lure of claim 1, further comprising means for selectively adjusting the angle between adjacent recesses and received color tubes.

11. The fishing lure of claim 1, wherein said connector body is modular in construction and further comprises means for locking said connector body to at least one other similar connector body.

12. The fishing lure of claim 11, wherein said locking means comprises a rotatable locking arrangement, wherein the locking connection between a pair of connector bodies is rotatable and provides selective adjustability of the resulting angular orientation of color tubes mounted in said connector bodies.

13. The fishing lure of claim 1, further comprising at least two color tubes for production of light of different colors, said color tubes received and maintained within respective recesses of said connector body in spaced, outwardly extending and non-aligned relationship to one another.

14. A multi-colored luminescent fishing lure comprising a modular connector body and a plurality of individual luminescent color tubes designed to produce different colors of light, said connector body having a plurality of spaced recesses for receiving respective color tubes, said recesses disposed in said body in an outward angular orientation from one another to maintain adjacent color tubes in spaced and non-aligned relationship with respect to one another, and a means for attaching said lure to a fishing line.

15. The fishing lure of claim 14, wherein said recesses are sized to frictionally receive a color tube and to frictionally retain said tube therewithin.

16. The fishing lure of claim 14, wherein said connector body comprises a tubular member having a pair of oppositely disposed recesses for receiving a pair of color tubes in relatively coaxial orientation, whereby said color tubes are oriented approximately 180 degrees from one another.

17. The fishing lure of claim 14, wherein said connector body comprises a substantially rectangular block structure having a plurality of outwardly facing planar surfaces, and a plurality of radially oriented recesses formed in said planar surfaces.

18. The fishing lure of claim 14, wherein said connector body comprises a substantially solid block structure having a center point and a rounded outer conformation, wherein said plurality of recesses are formed in said body in spaced, radially oriented relationship extending outwardly from adjacent said center point along divergent axes.

19. The fishing lure of claim 14, wherein said attaching means comprises a flexible member extending from said connector body for attaching the lure to a fishing line.

20. The fishing lure of claim 14, wherein said attaching means comprises means for relatively rigidly attaching said fishing lure to said fishing line.

21. A multi-colored chemiluminescent fishing lure comprising a modular connector body and a plurality of individual relatively rigid chemiluminescent color tubes designed to provide light of different colors, said connector body having a plurality of spaced recesses for receiving respective color tubes, said recesses disposed in said body in an outward angular orientation from one another to maintain adjacent color tubes in spaced and effectively oppositely disposed relationship with respect to one another, and means for attaching said lure to a fishing line.

22. The fishing lure of claim 21, wherein said connector body comprises a tubular member having a pair of oppositely disposed recesses for receiving a pair of color tubes in relatively coaxial orientation, whereby said color tubes are oriented approximately 180 degrees from one another.

23. The fishing lure of claim 21, wherein said connector body is relatively rigid and transmissive of light emitted from color tubes mounted in its recesses.

24. The fishing lure of claim 21, wherein said attaching means comprises a flexible member extending from said connector body for attaching the lure to a fishing line.

25. The fishing lure of claim 21, wherein said attaching means comprises means for relatively rigidly attaching said fishing lure to said fishing line.

* * * * *